United States Patent Office 3,302,021
Patented Jan. 31, 1967

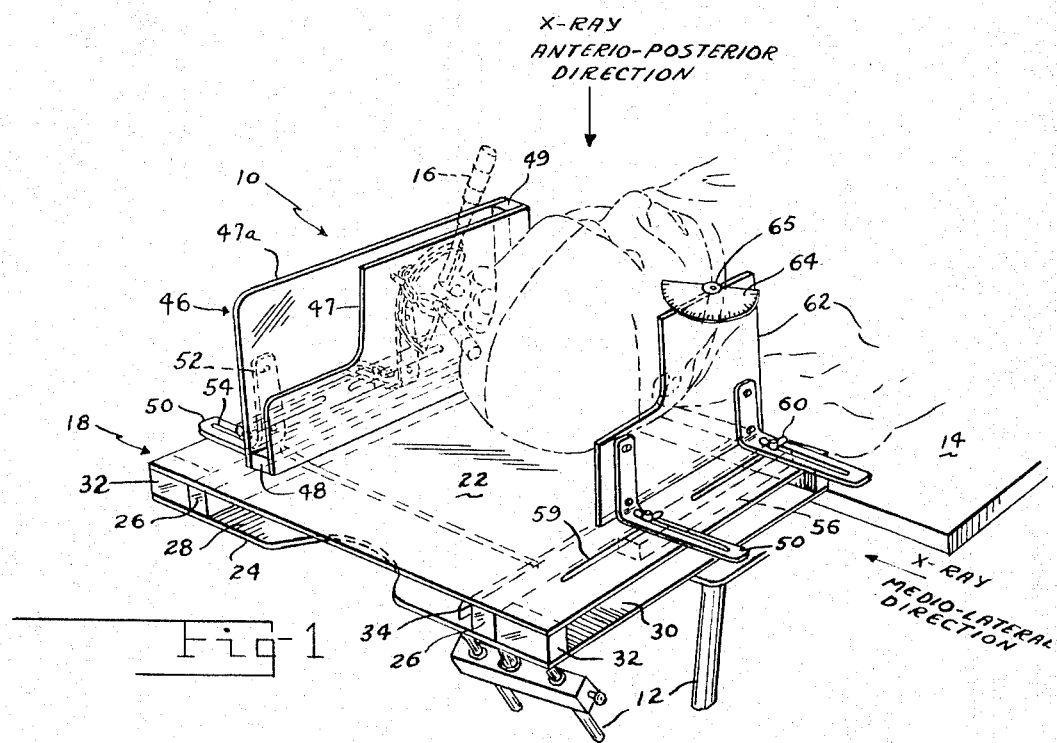
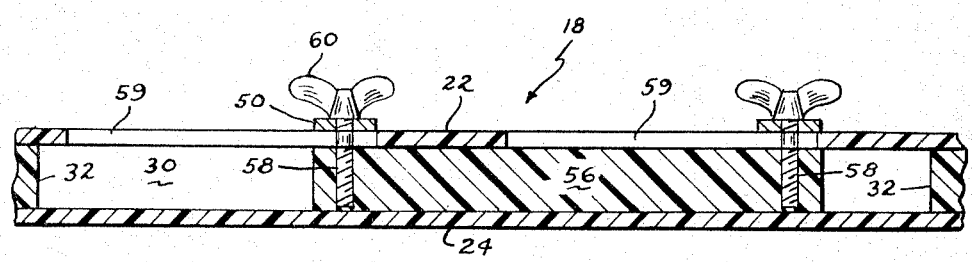

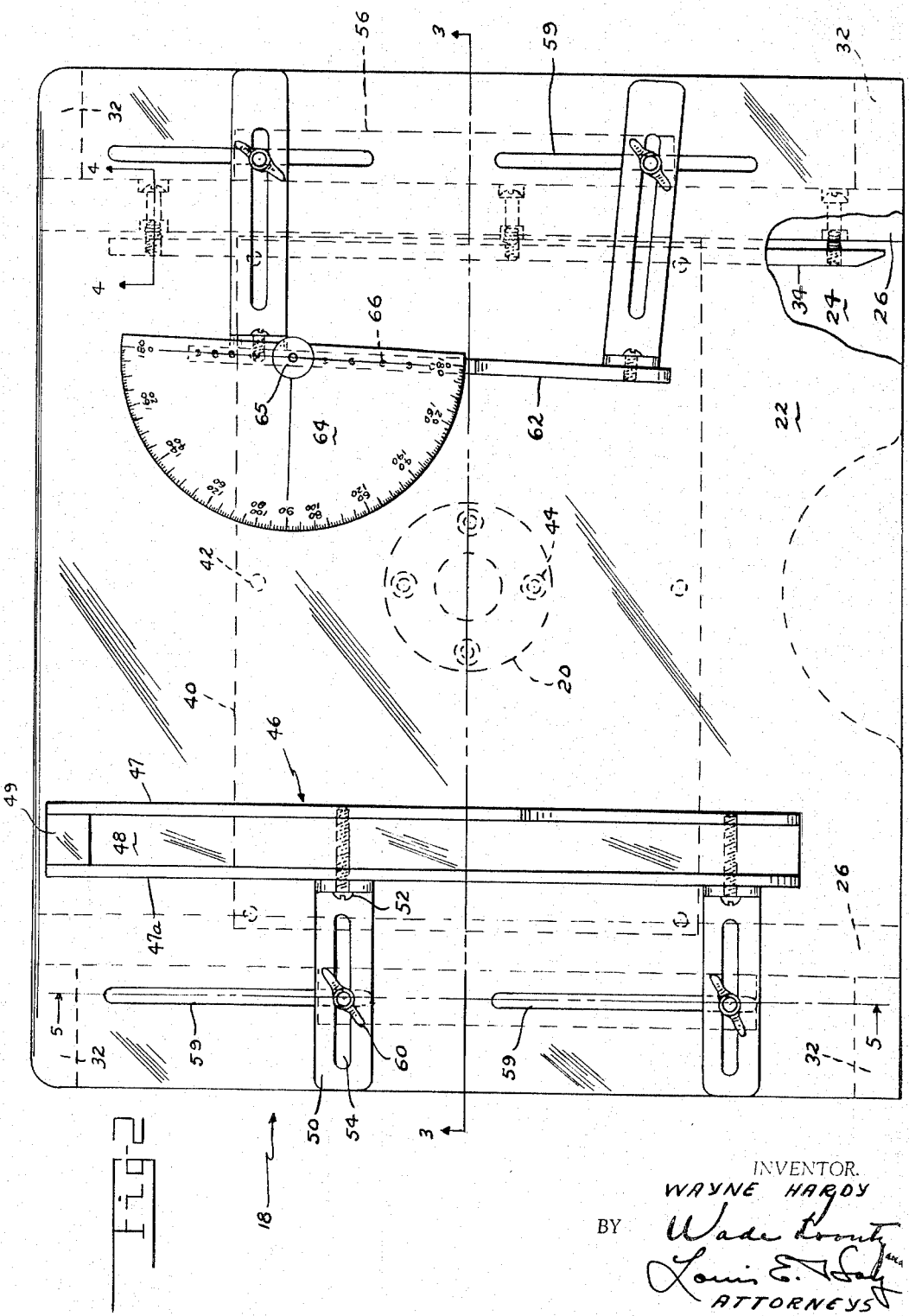

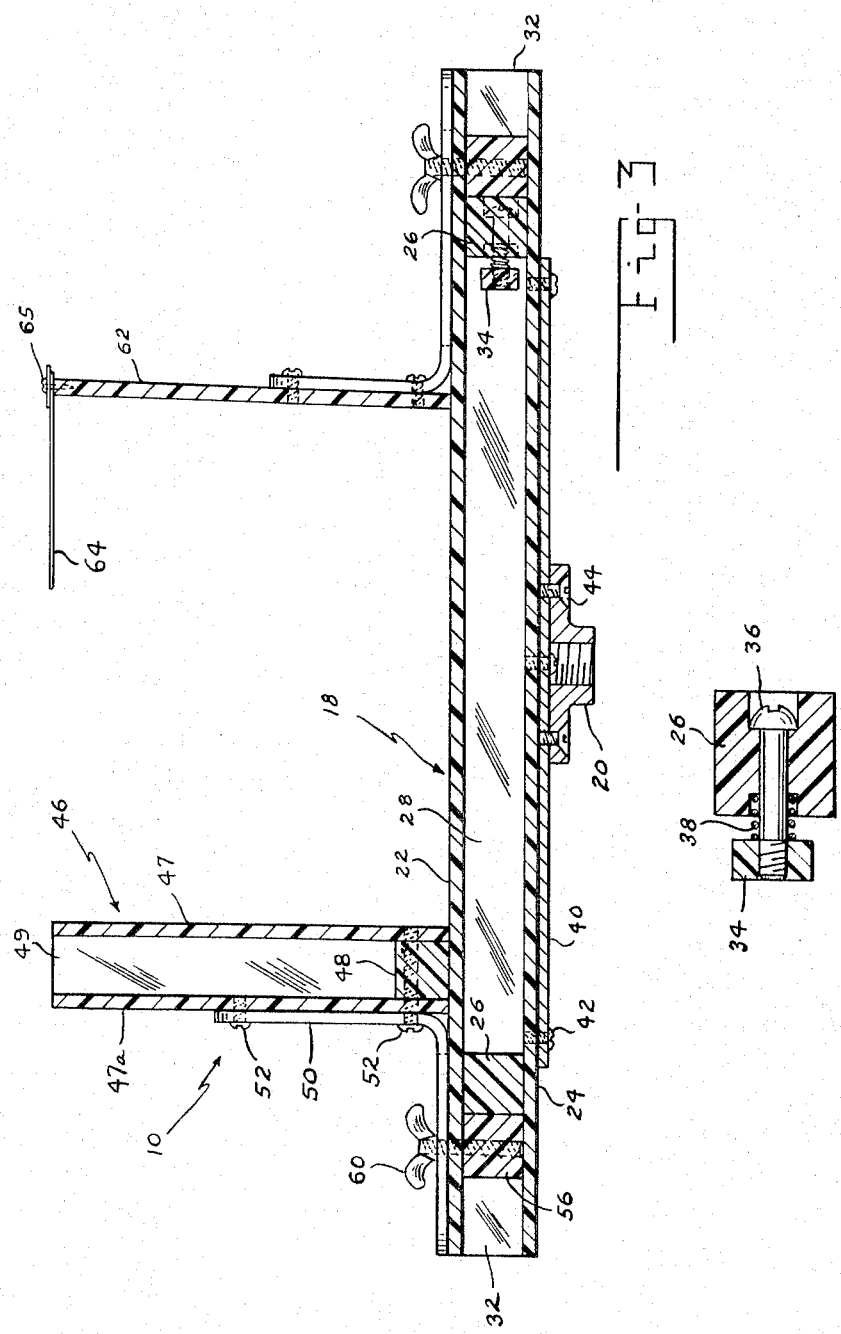

3,302,021
OPERATING TABLE ACCESSORY EXTENSION
BODY SUPPORT AND HOLDER FOR PLURAL
X-RAY FILM CASSETTES
Wayne Hardy, West Milton, Ohio
(Box 119M, R.F.D. 3, Griffin, Ga. 30223)
Filed May 1, 1964, Ser. No. 364,339
3 Claims. (Cl. 250—50)

The invention described herein may be manufactured and used by or for the United States Government for governmental purposes without the payment to me of any royalty thereon.

This invention relates to operating room equipment, and more specifically to accessory equipment for attaching to operating tables such as manufactured by the American Hospital Equipment Company. Such operating tables, in common with tables by other manufacturers, have universal brackets, one end of which may be removably joined to the operating table, and the other end used to support various accessories. Such brackets are customarily of a universal character in order that the attached accessory may be raised and lowered, moved to and from the table, and swiveled to any desired angle.

Although the accessory constituting this invention may be used with any portion of a surgical patient's body extending beyond the table proper, for purposes of illustrating the novelty and utility of the invention, it will be shown and described in connection with United States Patent 3,262,452 for Goniometer Apparatus for Brain Surgery, issued July 26, 1966. This patent discloses an apparatus and procedure used in certain neurosurgery. The present invention has been found to be an extremely useful supplement, not only during the course of the surgery, but also in connection with the taking of relating X-ray pictures.

X-ray pictures are usually taken in a special X-ray room, and if such a picture is desired during the course of an operation, the patient must be removed from the operating room and wheeled into the X-ray room. After being photographed, he is returned to the operating room. While this procedure will no doubt be continued for surgery in torso areas, such procedure may be simplified if the surgery is at body extremities. For example: in the neurosurgery to which the referenced patent relates, this invention not only provides a convenient head rest, but also provides a cassette holder during the taking of X-ray pictures in both the anterior-posterior and the medio-lateral directions by the use of a portable X-ray machine which can be wheeled into position. Such pictures may be taken at any time; before, during, and after the operation. Further novel features and uses of the present invention will be hereinafter disclosed.

One object of the present invention is to provide an accessory support, removably attachable to an operating table, for supporting an extending portion of a surgical patient's body.

Another object of the present invention is to provide an accessory support forming a cassette holder when taking X-ray pictures of that portion of the body being supported.

A further object of the present invention is to provide an accessory support in which a portion of a surgical patient's body may be given lateral support.

Yet another object of the present invention is to provide an accessory support having a vertical cassette holder which may be shifted from one side to the other.

A still further object of the present invention is to provide an accessory support having means for determining whether or not the surgical patient's body has moved during the taking of a series of X-ray pictures.

Another object of the present invention is to provide an accessory support having two X-ray cassette holders at substantially 90° to each other.

And yet another object of the present invention is to provide an accessory support in which the cassette holders are as near as possible to that portion of the surgical patient's body being X-rayed.

Additional objects, advantages and features of the invention reside in the construction, arrangement and combination of parts involved in the embodiment of the invention as will appear from the following description and accompanying drawings, wherein FIG. 1 is a perspective of the accessory support joined to the universal bracket (shown fragmentary) of an operating table to extend from the end of the table for supporting the head of a patient undergoing surgery;

FIG. 2 is a plan view of the accessory support shown on FIG. 1;

FIG. 3 is a sectional elevation along line 3—3 on FIG. 2;

FIG. 4 is a sectional elevation along line 4—4 on FIG. 2; and

FIG. 5 is a sectional elevation along line 5—5 on FIG. 2.

Referring to FIG. 1, the accessory extension support, which will be hereinafter referred to as support 10, is shown joined to the universal bracket 12 of operating table 14. Both the universal bracket and the operating table are well known and will not be further described. Resting upon the operating table and with his head resting on support 10, is a patient undergoing brain surgery by the procedure disclosed in, and the goniometer 16 (shown by dotted lines) of the above referenced patent.

The support 10, except for brackets and retaining screws and nuts, is to be made of material which will not adversely impede the transmission of X-rays. Clear plastic has been found to be an ideal X-ray pervious material, since it is transparent, is of relatively light weight and has good strength characteristics. The support 10 has a horizontal base member 18 forming the main supporting structure which is joinable to the universal bracket 12 by means of the threaded adapter 20 shown on FIG. 3.

The base member 18 has a substantially thin upper plane member 22 for supporting the extending portion of the patient's body, and a similar lower member 24 separated from the upper member 22 by two elongated side members 26 as best shown on FIG. 1, FIG. 2 and FIG. 3. The structure so formed provides a central recess 28 of relatively wide width, and a side recess 30 at each side of the structure. The central recess 28 is for receiving and holding in a horizontal position parallel to upper plane member 22, a standard X-ray film cassette. This recess, which loads and unloads from the end away from the operating table, is made to be somewhat wider than the cassette for reasons to be hereinafter explained. The purpose of the side recesses 30 will likewise be hereinafter explained. If desired, each corner of the base member may be supported by a support block 32. Although the base member 18, as shown and described, is built up of several elements which may be joined by any of numerous well known conventional methods, it obviously could be molded as a unit structure. The base member 18, as shown and described, provides a structure for supporting the film cassette so that there is a relatively small distance between the member of the patient's body to be X-rayed and the film in the film cassette. Therefore, parallax and aberration errors on the film are minimized.

Extending the full length along one side of the central recess 28, is a push bar 34 which is movably supported by one of the elongated side members 26 as best shown on FIG. 2 and FIG. 3. As best shown on FIG. 4, the side member 26 contains a plurality of reamed holes transverse to the central recess 28 for slidably receiving screws 36. Each screw is in threaded engagement with the push bar 34 and moves with the bar. A biasing means, such as a compression spring 38, coaxially surrounds each screw and is disposed between the push bar 34 and side member 26 to bias the push bar away from the side member toward the center of the central recess 28. When the cassette is inserted, the push bar will hold the cassette against the side member 26 on the opposite side of the recess from the push bar. The desirability for positively locating the cassette in this manner will be more fully explained under the operation of the support.

Referring to FIG. 3, there is shown disposed between the lower member 24 and the threaded adapter 20, a reinforcing plate 40 which is retained in position against the lower member 24 by a plurality of screws 42; the threaded adapter 20 being joined by screws 44. The reinforcing plate 40 may be of any convenient material, including any metal, since it will not interfere with X-rays being transmitted from above the support 10.

Removably joined at substantially 90° to and lateral with the central recess 28 in base member 18, is a vertical cassette holder 46 upwardly extending from the upper face of the upper plane member 22. This vertical cassette holder may be made in any convenient form, such as with substantially thin plane side members 47 and 47a which are held in spaced and parallel relationship by a bottom member 48 and an end member 49 disposed between the side members. The cassette holder should be made of a material having the same characteristics as the material from which the base member 18 is made in order to not impede the transmission of X-rays. If desired, the cassette holder may easily be molded of plastic as a unit structure. The interior edges of the bottom member 48 and end member 49 form the reference surfaces against which the film cassette is aligned. The vertical cassette holder 46, as shown and described, provides a structure for supporting the film cassette so that there is a relatively small distance between the member of the patient's body to be X-rayed and the film in the film cassette. Therefore, parallax and aberration errors on the film are minimized. Joined to the vertical cassette holder are two right angle brackets 50 which are retained in place by a plurality of screws 52. The horizontal leg of each angle bracket contains an elongated slot 54.

Referring to FIG. 5, the side recess 30, previously described in connection with the horizontal base member 18, contains a slidable support means such as the elongated sliding support block 56. Joined to each end of the support block is a threaded stud 58 upwardly extending through an elongated slot 59 in the upper plane member 22 of the base member 18 as best shown on FIG. 2. Each stud 58 further passes through the elongated slot of a bracket 50, which is releasably held in a selected position by means of a wing nut 60. It is thus seen that the vertical cassette holder may be positioned both longitudinally and transversely in relation to the central recess 28 in base member 18.

Positioned on the opposite side of base member 18 is a vertical support member 62 for transversely supporting the protruding portion of the patient's body against the vertical cassette holder 46. The vertical support member should be made of a material which will not impede the transmission of X-rays and has joined thereto two brackets 50 as previously described. The vertical support member 62 is removably joined to and is adjustable in the same manner as the vertical cassette holder 46; and, therefore, need not be repeated. It is thus noted that the vertical cassette holder 46 and the vertical support member 62 may be interchanged to permit medio-lateral X-ray pictures to be made from the opposite direction; or, a second vertical cassette holder may be substituted for the vertical support member to permit X-ray pictures from both directions. Pivotally mounted so as to be substantially parallel with the upper face of base member 18, is a conventional indexing means such as protractor 64 mounted on an upper edge of the vertical support member 62; as best shown on FIG. 1. The protractor may be held in place by screw 65 as best shown on FIG. 3. The upper edge of the vertical support member 62 is provided with an index line coinciding with the base line of the protractor; the index line being used in reading the protractor. The function of the protractor will be hereinafter explained. A series of tapped holes 66 are spaced along the index line as shown on FIG. 2. These tapped holes provide alternate positions at which the protractor may be located.

It is noted that in the support 10, above described, the vertical support member 62 may be replaced by a second vertical cassette holder 46, if desired. Also, that the position of the vertical support member and the vertical cassette holder may be reversed from the positions shown. It is further noted that although the vertical cassette holder should always be substantially parallel with the central recess 28 in the horizontal base member 18, the brackets 50 joined to the vertical support member 62 may be slightly canted as shown, in order to better support the patient's body.

When surgery of the character described in the referenced patent is in progress, the patient's head with attached goniometer 62 is resting upon the support 10 as shown in FIG. 1. In order to provide more clearance for the goniometer and for the surgeon's hands, the vertical cassette holder 46 and the vertical support member 62 may be relieved as shown in FIG. 1. Such relief may be at the convenience of the user and does not constitute a portion of this invention. Similar relief, as shown in FIG. 1, may be made in the lower member 24 of the base member 18 to facilitate the insertion and removal of the X-ray cassette from the central recess 28.

The following procedure has been found to be very satisfactory in making the pre-operative X-ray exposures for determining the angular position for the cannula guide of the goniometer 62 by the film method disclosed in the referenced patent. A loaded film cassette with attached grid scale is inserted into the horizontal central recess 28. The patient's shaved head with the scribed center line is then placed on the support. The vertical cassette holder is then longitudinally adjusted to a convenient position; and is also adjusted to the proper lateral position as will make the scribed line on the patient's head coincide with the center line on the grid scale attached to the horizontal cassette, when the patient's head is snugly against side member 47 of the vertical cassette holder. The vertical support member is then laterally adjusted to hold the patient's head in the selected position. The protractor is then located in a proper hole which will permit the base of the protractor to come into contact with some convenient portion of the patient's face; such as his cheek bone, for example. The protractor reading is then noted and recorded. A loaded film cassette is then inserted into the vertical cassette holder and shoved against end member 49. It is noted that the film cassette in the vertical cassette holder is indexed to a known position by coming into contact against end member 49, and by gravity holding the cassette against bottom member 48. The film cassette in the central recess 28 is indexed against the left side member 26, as shown on FIG. 1, by means of the push bar 34.

The portable X-ray machine is now wheeled into proper position for making the exposures. The directions of the ray projections for both the antero-posterior and medio-lateral directions are indicated on FIG. 1. Since, as explained in the referenced patent, it is absolutely necessary for making a correct determination of the goniometer setting, that the X-ray pictures are taken normal to each other, the patient must not twist, roll, or otherwise move his head from the fixed position. Should he move his position, this movement will be reflected on the protractor. It will then be necessary to put the head back to its original position; or, to make a new series of pictures. A great deal of time may be saved by using two X-ray machines; one for taking antero-posterior pictures, and the other for taking medio-lateral pictures. By using two X-ray machines, the pictures may be taken with very little time lapse between pictures.

An example of X-ray pictures which may be desired during the course of an operation are pictures showing the terminal position of the cannula in relation to the target area of the patient's brain. This may be desired as part of the clinical records; or, as a check on the accuracy of the pre-operative procedure.

One example of post-operative X-rays, which may be desirable, are pictures showing the results of the operation, and to repeat the operation if the first attempt did not obtain complete results in respect to the brain tissue at the target area.

Various other reasons may be stated for taking a series of pictures. These reasons would include the desirability of leaving a complete set of graphic records, the study of new techniques, and for defensive reasons.

It is to be understood that the embodiment of the invention as shown and described is to be regarded as illustrative only, and that the invention is susceptible to variations, modifications and changes within the scope of the appended claims.

I claim:

1. For use on a surgical operating table having an accessory universal bracket; an operating table accessory extension body support and X-ray film cassette holder comprising: a horizontal base member having an X-ray pervious substantially thin planar upper body support member, a lower member adapted for removably joining to the universal bracket on the operating table, a central recess for holding a first X-ray film cassette in close proximity to said upper body support member and formed by a first and a second elongated side member longitudinally joined to and between said upper body support member and said lower member, and biasing means within the central recess movably supported by one of said elongated side members for laterally biasing the first X-ray film cassette to an indexed position against the second elongated side member; an X-ray pervious vertical X-ray film cassette holding means joined to said base member for holding a second X-ray film cassette laterally above and substantially normal to the first X-ray film cassette in said base member, said vertical X-ray film cassette holding means having a bottom member and an end member for indexing two adjacent edges of the second X-ray film cassette and further having a substantially thin planar side member for laterally supporting the protruding portion of the patient's body to be in close proximity to the second X-ray film cassette, said base member and said vertical X-ray film cassette holding means having cooperating adjusting means for longitudinally and laterally positioning said vertical X-ray film cassette holding means on said base member; and X-ray pervious vertical support means joined to said base member for laterally holding the protruding portion of the patient's body against said vertical X-ray film cassette holding means, said base member and said vertical support means having cooperating adjusting means for longitudinally and laterally positioning said vertical support means on said base member.

2. An operating table accessory extension body support means and X-ray film cassette holder in accordance with claim 1 in which:

the cooperating adjusting means between said base member and said vertical X-ray film cassette holding means and the cooperating adjusting means between said base member and said vertical support means are substantially the same for permitting position interchange between said vertical X-ray film cassette holding means and said vertical support means on said base.

3. An operating table accessory extension body support means and X-ray film cassette holder in accordance with claim 1 in which:

(a) the cooperating adjusting means between said base member and said vertical X-ray film cassette holding means and the cooperating adjusting means between said base member and said vertical support means are substantially the same for permitting position interchange between said vertical X-ray film cassette holding means and said vertical support means on said base, and further having:

(b) an indexing means movably joined to said vertical support means for contacting the protruding portion of the patient's body resting on said base member and indicating any change in position thereof on said base member during the taking of X-ray pictures.

References Cited by the Examiner
UNITED STATES PATENTS

| | | | |
|---|---|---|---|
| 2,560,782 | 7/1951 | Scholz | 250—66 |
| 2,826,702 | 3/1958 | Campbell et al. | 250—50 |
| 3,025,397 | 3/1962 | Travis et al. | 250—50 |

RALPH G. NILSON, *Primary Examiner.*

JAMES W. LAWRENCE, ARCHIE R. BORCHELT, *Examiners.*

W. F. LINDQUIST, *Assistant Examiner.*